United States Patent [19]

Aggarwal et al.

[11] Patent Number: 5,375,020

[45] Date of Patent: Dec. 20, 1994

[54] METHOD AND APPARATUS FOR WRITING OR READING SERVO INFORMATION

[75] Inventors: Vinay K. Aggarwal, Burlington; Bernardo Rub, Shrewsbury; William D. Lewis, Northboro, all of Mass.

[73] Assignee: Digital Equipment Corporation, Maynard, Mass.

[21] Appl. No.: 77,711

[22] Filed: Jun. 15, 1993

Related U.S. Application Data

[63] Continuation of Ser. No. 588,373, Sep. 26, 1990, abandoned.

[51] Int. Cl.⁵ .......................... G11B 5/596; G11B 7/00
[52] U.S. Cl. ................................. 360/72.1; 360/77.05; 360/77.08; 369/44.26
[58] Field of Search ................... 369/44.26, 48, 58, 32, 369/34, 47; 360/72.1, 77.02, 77.03, 77.05, 77.08, 78.04, 78.11, 78.14, 77.12, 75

[56] References Cited

U.S. PATENT DOCUMENTS

| | | | |
|---|---|---|---|
| 3,277,453 | 10/1966 | Michel | 360/47 |
| 4,414,589 | 11/1983 | Oliver et al. | 360/77.08 |
| 4,586,094 | 4/1986 | Chambers et al. | 360/77.12 |
| 4,688,119 | 8/1987 | Blessum | 360/77.08 |
| 4,783,705 | 11/1988 | Moon et al. | 360/77.08 |
| 4,807,063 | 2/1989 | Moteki | 360/79.04 |
| 4,811,135 | 3/1989 | Janz | 360/77.05 |
| 4,896,228 | 1/1990 | Amakasu et al. | 360/77.05 |
| 4,967,292 | 10/1990 | Moteki | 360/77.05 |
| 4,977,051 | 12/1990 | Eggebeen | 360/21 |
| 5,050,144 | 9/1991 | Henderson et al. | 369/13 |
| 5,138,511 | 8/1992 | Hoshimi et al. | 360/77.08 |

FOREIGN PATENT DOCUMENTS 53-83717 of 1978 Japan.

*Primary Examiner*—W. R. Young
*Assistant Examiner*—Nabil Hindi
*Attorney, Agent, or Firm*—Albert P. Cefalo; Ronald C. Hudgens; Mary M. Steubing

[57] ABSTRACT

A method and apparatus for writing and reading servo data placed on a plurality of disk surfaces to minimize the degree of overlap of headers written or read by each write/read channel. Time division de-multiplexing (selecting) the writing of servo data to disk surfaces from each write/read channel and time division multiplexing the reading of servo data from the staggered headers contained on the disk surfaces coupled to each write/read channel increases the number of surfaces written to or read in a single rotation by each write/read channel. Disk surfaces are coupled to the write/read channels in groups to minimize the number of rotations required to write to or read from all the surfaces contained in the groups. Groups of surfaces may be sub-grouped. The headers of sub-groups are interleaved so that portions of the header written in a separate disk pass whose length is less than half the total length of the header may be written or read in the same rotation as another group of surfaces.

6 Claims, 14 Drawing Sheets

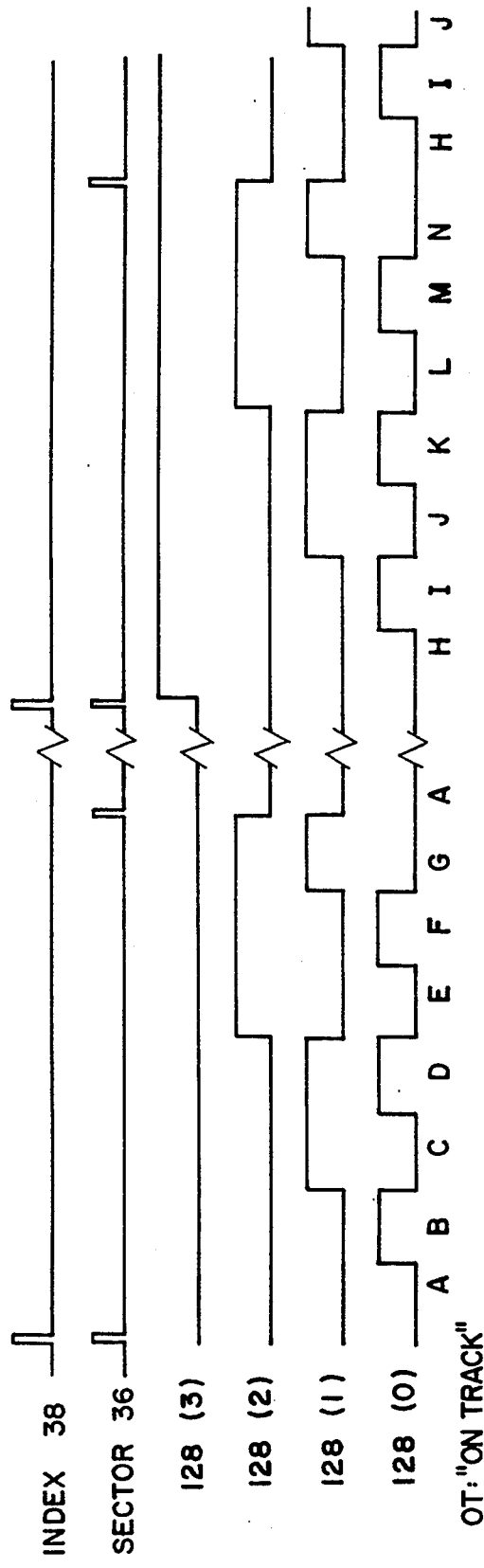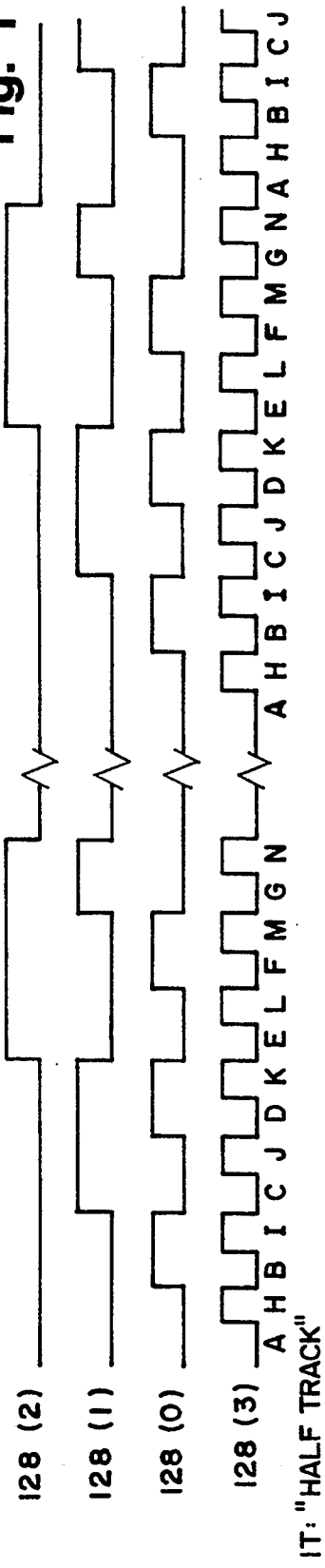
Fig. 11B
Fig. 11A
WRITE H/W TIMING FOR A 14 HEAD, ONE PRE-AMP SYSTEM WHERE HALF TRACK INFORMATION IS WRITTEN IN ONE PASS, WHEREAS ON-TRACK HEADER INFORMATION IS WRITTEN IN TWO PASSES

H/W TIMING FOR A 14 HEAD
ONE PRE-AMP DATA COLLECTION
FOR ONE DISC ROTATION

METHOD AND APPARATUS FOR WRITING OR READING SERVO INFORMATION

This application is a continuation of application Ser. No. 07/588,373, filed Sep. 26, 1990 now abandoned.

FIELD OF THE INVENTION

The invention generally relates to devices and methods for writing information onto or reading information from disk storage media. In particular, this invention relates to devices and methods for minimizing the time and electronic hardware needed for writing servo-data onto or reading servo-data from a plurality of disk media surfaces.

BACKGROUND OF THE INVENTION

In order to read data from or write data onto a disk media surface of a disk drive, a read/write head must be positioned precisely over a track of the media surface from which data is read or on which data is written. Failure to accurately position the read/write head over the desired track during a read operation results in inaccurate data retrieval. If the read/write head is improperly positioned during a write operation to the disk, not only is the written data lost, but data on adjacent tracks may be written over and destroyed. The accurate placement of the read/write head is therefore crucial to the utility of disk systems.

There are two general methods of positioning the read/write head over a particular track in order to retrieve or store data. In the first head positioning method, no head position feedback is provided. Instead, a stepper motor responds to a distance signal to shift the head a specified number of tracks. The disk drive does not sense the present position of the head. The reliability of this method for reading and writing data depreciates greatly as the tracks become more closely packed.

The second head positioning method utilizes head position data written on the disk surface to provide position feedback to the disk head controller in order to precisely position the read/write head in the center of the data track. Systems utilizing this method of head position control generally fall into two categories, servo-surface-servo-systems and data-surface-servo-systems.

The primary difference between the two servo-system approaches is the number of disks containing reference or servo information. In servo-surface-servo-systems, not the subject of the present invention, disk reference or servo information is stored on one surface of the disk. However, in data-surface-servo-systems to which this invention applies, each disk surface contains reference or servo information.

In data-surface-servo-systems writing servo data onto each disk surface occurs during the manufacturing process. A single pre-amplifier is interfaced to several disk surfaces and reads or writes to only one track of one disk surface at a time. When the servo-writing system writes to only one track per disk rotation, a substantial amount of time is consumed while the read/write head waits for the disk to reach a proper position before transmitting data. This servo-writing process takes anywhere from ten minutes for a single surface to a few hours for a fully embedded multiple surface system. When the servo-writing takes a few hours, the servo-surface preparation stage becomes a serious bottleneck in the hard disk manufacturing process. Eliminating or decreasing the severity of this bottleneck requires either an increase in the number of servo-writing devices or a decrease in the time required to write the servo data onto the disk surfaces.

Prior art systems have increased the number of pre-amplifiers and active read/write channels to exploit parallelism and decrease the time necessary for servo-writing each set of disks contained in a disk unit. Of course, the addition of multiple channels to the servo-writing system results in a proportional increase in throughput. However, the cost and complexity of the system also increases in proportion to the number of active writing channels. Furthermore, the likelihood of malfunction increases as the complexity of the servo-writing system increases. The increased cost and probability of malfunction of the multiple channel servo-writing device balances against any time benefits realized by increased parallelism in the servo-writing system. Furthermore, since the disk drive itself is capable of writing onto only one surface at a time, the multiple channel servo-writing systems must use external writing heads. These heads are used only during the servo-writing step in the manufacturing process and not during the normal operation of the disk drive. In prior art servo-writing systems the use of external heads to write servo data onto a disk surface decreased the quality of the servo data later read by the disk drive's own head due to incomplete compatibility between the servo-write device and the disk data retrieval device.

SUMMARY OF INVENTION

The present invention is a method and apparatus for time division switching the writing or reading of servo data onto or from a plurality of disk surfaces served by a single read/write channel, hereinafter sometimes referred to as service channel, by positionally staggering the locations to which servo data is written on different disk surfaces. The positions of adjacent headers containing the servo data are shifted at least the effective header length. The effective length of a header is determined by the longest segment of servo-data written onto the disk surfaces in a single pass, plus a minimum number of bytes of buffering at the end of a written or read segment for switching between disk surfaces read or written by the servo system. The shifting of the location of header information minimizes the overlap of headers and facilitates time division switching of the surfaces for transfer of servo data to and from the disk surfaces written or read by a single pre-amplifier within a single disk rotation.

During the write operation the servo data (header) or at least one portion thereof is selectively written onto each sector of each surface per revolution. Accordingly, the servo data in the same sector of a plurality of distinct surfaces is staggered or offset by an amount equal to at least the effective header length. During the read operation the servo data from each surface is time division multiplexed by the service channel. The combined function of de-multiplexing write servo data and time division multiplexing read servo data is referred to throughout the specification as time division switching. Furthermore, selecting will be used interchangeably with de-multiplexing.

The present invention time division switches the reading of servo data from and writing of servo data to multiple disk surfaces within a single disk rotation. Assuming that information can be written through a single pre-amplifier or service channel to a maximum of N surfaces without temporal overlap between the data written on the N surfaces, time division switching writes servo data onto the disks' surfaces up to N times faster than prior art single service channel systems which do not servo-write or verify servo-data from multiple disk surfaces within a single disk rotation. Instead of writing onto a single surface per disk rotation, the servo-writing system of the present invention writes or reads up to N disk surfaces in a single rotation by positionally offsetting the locations of the headers written onto the same sectors of surfaces connected to the same service channel by at least the effective header length.

When the number of disk surfaces exceeds the number of surfaces that can be read or written by a single pre-amplifier or service channel (N surfaces) within a single disk rotation using the time division switching method, writing to all the surfaces using a single pre-amplifier or service channel requires additional rotations. In cases where multiple rotations are required to read or write to all the disk's surfaces, if the effective length of burst fields portion of the servo data is less than half the effective header length, then interleaving the burst fields reduces the time required to write/read and verify the burst field information. Interleaving is accomplished by positionally shifting the beginning points of all the headers written in the second disk rotation by at least an additional rotational distance equal to the effective length of the burst fields. Additional shifting for providing a greater degree of interleaving depends upon the ratio of the effective header length to the effective length of the burst fields. Interleaving the burst fields enables the servo-writer to at least double the maximum number of disk surfaces read from or written to within a single rotation by a single pre-amplifier.

The maximum quantity of surfaces read from or written to in a single rotation (Q) in a disk system containing greater than N surfaces is increased if additional service channels or pre-amplifiers are utilized to combine the benefits of time division switching and parallel writing to disk surfaces. When multiple pre-amplifiers or service channels are used to prepare disk surfaces with servo data, and the time division switching method of the present invention is used, the number of pre-amplifiers or service channels required to write onto or read from all disk surfaces within a single rotation is reduced by up to a factor of N depending upon the number of disk surfaces contained in the disk drive.

DESCRIPTION OF THE DRAWINGS

FIGS. 11(A) and 11(B) are a timing diagram showing the head select timing for writing the on-track and half-track data in an 14 disk surface, single pre-amplifier servo system.

DETAILED DESCRIPTION OF THE PREFERRED EMBODIMENT

Figure 1:
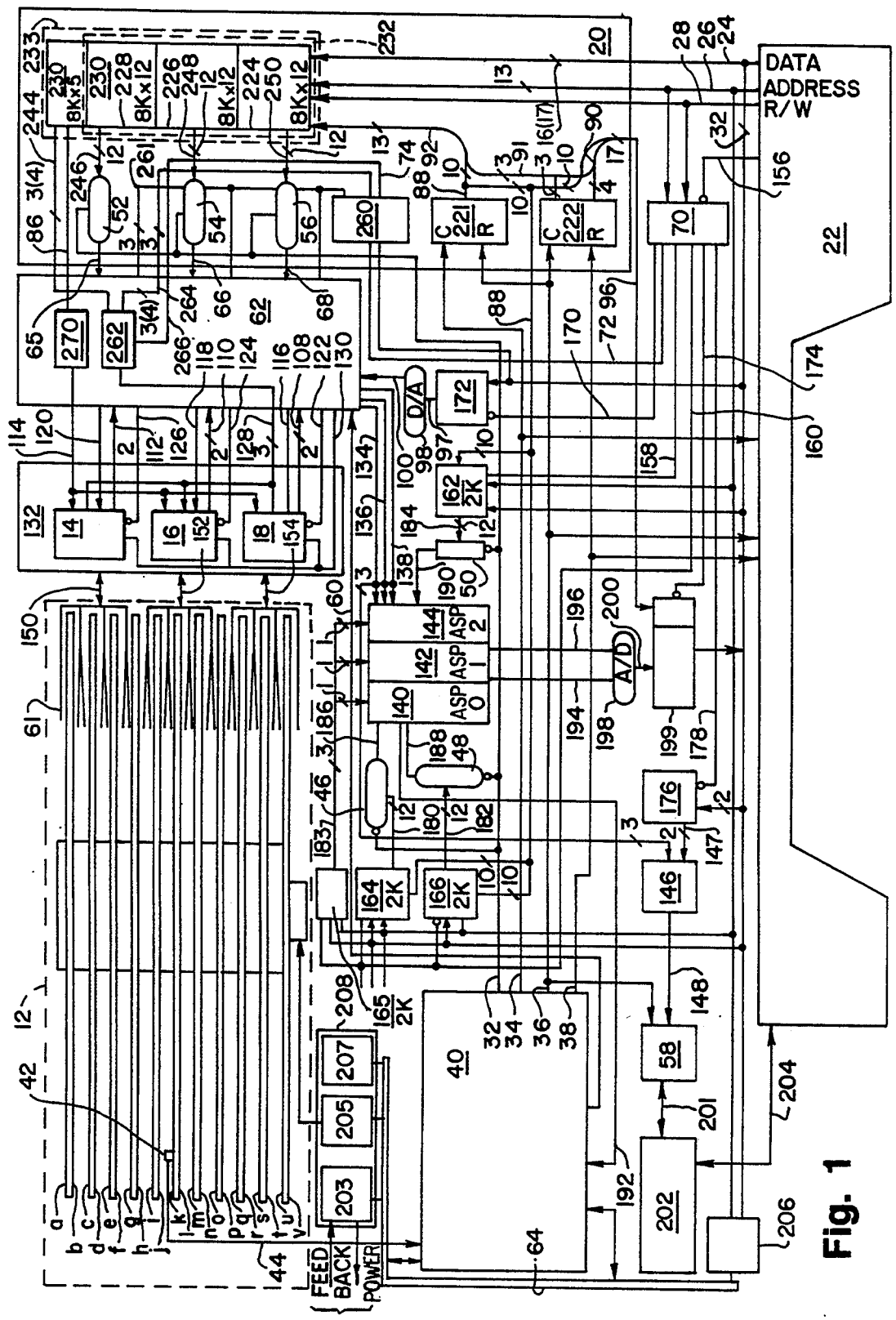
FIG. 1 is a block diagram of the servo data system using multiple read/write channels according to the present invention.
Figure 2:
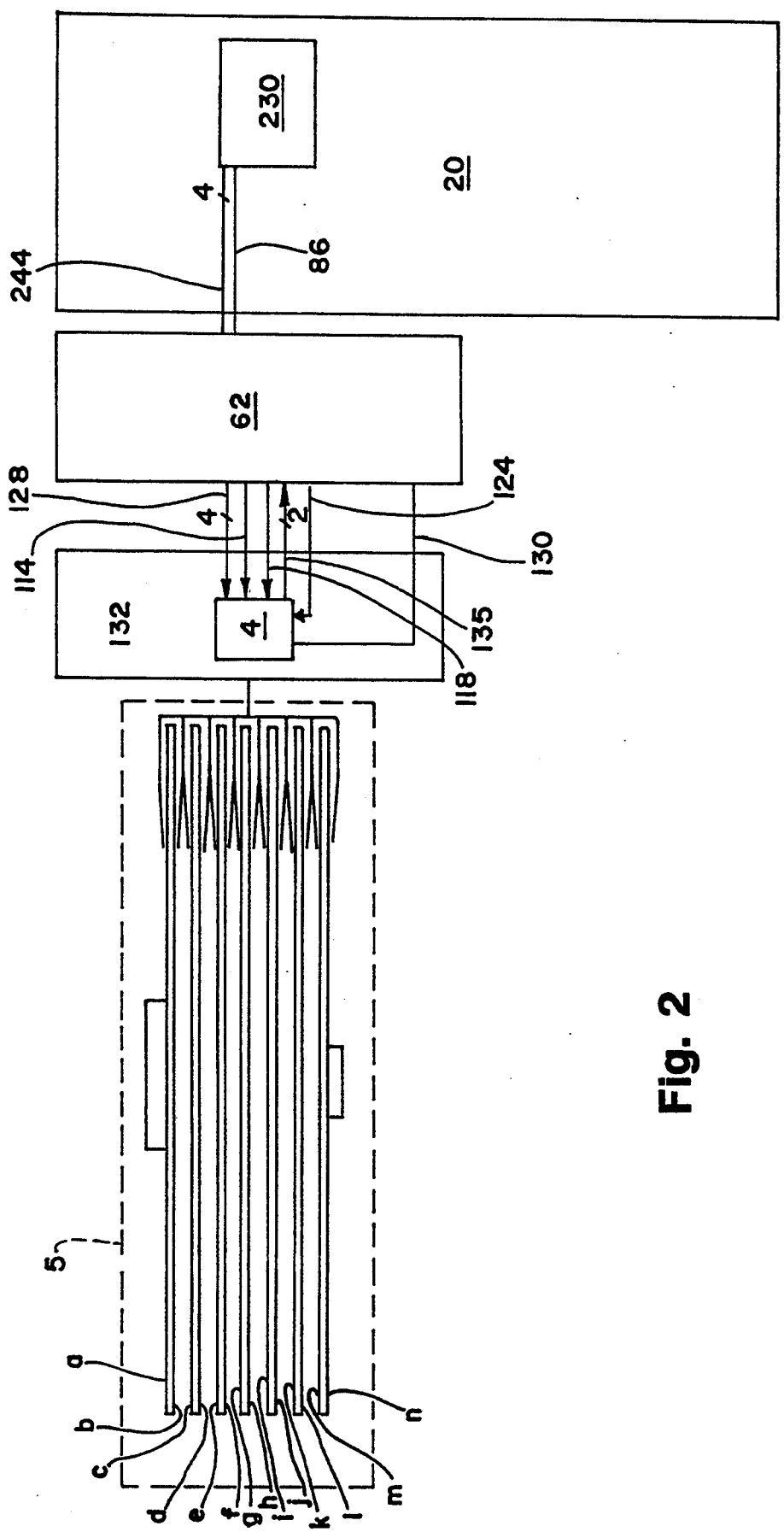
FIG. 2 is a block diagram of a servo data system using a single read/write channel servicing more than N surfaces according to the present invention.

Referring to the drawings, wherein like characters designate like or corresponding parts throughout the views, FIG. 1 shows a preferred embodiment of the servo write/read system 10. The servo write/read system 10 combines the benefits of operating multiple pre-amplifiers or read/write channels, hereinafter sometimes referred to as service channels, in parallel and time division switching each pre-amplifier or service channel in order to service, e.g. complete read or write operations, to twenty-two surfaces in a single disk rotation. Of course the present invention of time division switching access to multiple disk surfaces within a single disk rotation for a servo write/read system is usable whether single or multiple service channels are used. The preferred embodiment uses multiple service channels and is shown in FIG. 1 while an alternative embodiment uses a single service channel and is shown in FIG. 2.

A plurality of disks 12 are arranged in a stack to form part of a disk drive as is well known in the field. In the preferred embodiment, there are eleven disks with each disk having a top and bottom surface and servo data is written onto each disk surface. Of course the number of disks and corresponding surfaces included is a matter of design choice and can be increased or decreased with routine changes in the system control and hardware. For purposes of description the top and bottom surfaces of the first disk of the plurality of disks 12 are referred to as surfaces a and b respectively, the top and bottom surfaces of the second disk of the plurality of disks 12 are referred to as surfaces c and d respectively, and this process of lettering the top and bottom surfaces continues until the top and bottom surfaces of the bottom or eleventh disk of the plurality of disks 12 are referred to as u and v respectively. Each surface of each of the plurality of disks 12 is servo-written by a read/write head. Therefore, a total of twenty-two read/write heads are required to read and write servo data onto the plurality of disks 12.

A first read/write or service channel comprising pre-amplifier 14 services via appropriate read/write heads seven disk surfaces a to g, a second service channel comprising pre-amplifier 16 services via appropriate read/write heads eight disk surfaces h to o, and a third service channel comprising pre-amplifier 18 services via appropriate read/write heads disk surfaces p to v. Of course, the selection of which disk surfaces are serviced by which channels is a matter of design choice and any appropriate combination or permutation is feasible.

In the preferred embodiment, the timing of the writing of data onto the disk surfaces is provided by a clock system 40. Initially, the clock system 40 transmits a very high frequency train of clock pulses to a clock head 42 on line 44. The clock head 42 writes the clock pulses onto the surface k of the plurality of disks 12. Of course, another surface could be substituted for this function. Once the clock pulses or track is established, the clock head 42 reads the clock pulses from disk surface k and transmits very precise and accurate timing signals on line 44 to the clock system 40. The clock system 40 transmits a bit clock signal on line 32 to 12-bit parallel load shift registers 46, 48, 50, 52, 54, and 56. The clock system 40 also transmits a byte clock signal on line 34 to a servo-writer computer 22 and a pattern generator 20. The clock system 40 transmits a sector clock signal on line 36 to the servo-writer computer 22, the pattern generator 20 and a drive module 58. The clock system 40 also transmits an index signal on line 38 to the pattern generator 20 and the servo-writer computer 22. The clock system 40 also transmits a write enable signal on line 60 to a read/write interface 62. Finally, the clock system 40 is connected to a servo-writer control bus 64 by standard bus interface circuitry well known to those skilled in the art.

The pattern generator 20 receives address, data, and control signals from the servo-writer computer 22 on a 13-bit address bus 26, a 16-bit data bus 24, and control line 28. The pattern generator 20 receives timing signals on lines 32, 34, 36 and 38 from the clock system 40. The pattern generator 20 receives and temporarily stores head and pre-amplifier selection and control signals from data bus 24 under the control of the output of a decoder 70 on line 72.

The pattern generator 20 transmits data serially in groups of 12-bit bytes of information to the read/write interface 62 on lines 65, 66, and 68. The pattern generator 20 transmits head selection information on 3-bit parallel lines 244 to the multiplexer 262 of the read/write interface 62. A fourth head select line (not used) is available for referencing a total of 16 disk heads per pre-amplifier.

In the preferred embodiment, the pattern generator 20 also transmits a write enable signal on line 86. In addition to data and address information, the pattern generator 20 also transmits a byte count output on 10-bit parallel lines 88 to the address inputs of sample generators 162, 164, 165 and 166. Finally, the 7-bit parallel sector counter output of sector counter 222 on line 90 is combined with the 10-bit parallel byte counter output of byte counter 221 on line 88 to provide a 17-bit reference signal on lines 96 in order to identify the location on the disk 12 of a received servo correction number (SCN).

The read/write interface 62 receives a write current from a digital to analog converter 98 on line 100. The write current is transmitted to the pre-amplifiers 14, 16 and 18 on lines 130. The write current on line 130 is the actual current used to write information onto the disk surfaces.

A multiplexer 262 of the read/write interface 62 receives head select signals from a head select memory 230 and a register 260 on lines 244 and 264. The multiplexer 262 selectively transmits head select signals 244 or 264 on line 128 to the pre-amplifiers 14, 16, and 18 based upon the select signal transmitted by the register 260 on line 266.

The primary function of the read/write interface 62 is to buffer signals and to prevent floating input signals to the pre-amplifiers from inadvertently turning on a pre-amplifier 14, 16 or 18. The read/write interface 62 transmits a write enable signal on line 114; data to be transferred to the plurality of disks 12 on lines 116, 118, and 120; pre-amplifier select signals on lines 122, 124 and 126; and head select data on 3-bit parallel lines 128. The read/write interface 62 receives clock and header information from the pre-amplifiers 14, 16 and 18 on lines 108, 110 and 112. The read/write interface 62 transmits this information on lines 134, 136 and 138 to analog signal processors (ASPs) 140, 142, and 144 respectively. The read data on lines 134, 136 and 138 is also transmitted to a multiplexer 146. The multiplexer 146 selectively transmits the read data signals from lines 134, 136 and 138 to the drive module 58 on line 148 based on selection signals received on line 147 from a verification control register 176. The verification control register 176 receives 2-bit parallel data from the data bus 24 and receives a control signal from the decoder 70 on line 178.

The pre-amplifiers 14, 16 and 18 receive and transmit data to the twenty-two disk surfaces by means of twenty-two sets of lines 150, 152, and 154 connected to pre-amplifiers 14, 16, and 18 in groups of 7, 8 and 7 respectively. Each set of lines connects a read/write head to its respective pre-amplifier 14, 16 or 18. The functions and connection of the lines 150, 152 and 154 is well known in the art.

The decoder 70, receives control signals from the servo-writer computer 22 on lines 156, 26 and 28. The decoder 70 transmits a write current control signal on line 72 to the pattern generator 20. The decoder 70 also transmits enable signals on line 158 to an automatic gain control (AGC) sample generator 162 and on line 160 to A sample generator 164, B sample generator 166 and head switch sample generator 165. Decoder 70 transmits an enable signal on line 170 to a write current register 172. The decoder 70 transmits control signals to a SCN register 199 on line 174. The decoder 70 transmits a control signal on line 178 to a control register 176. The sample generators 162, 164, 165 and 166 all receive similar address and data input from the address bus 26 and the data bus 24. The data stored in each generator 162, 164, 165 and 166 is of course distinct. The sample generators are selectively enabled by control lines 158 and 160 from the decoder 70 depending upon the mode of operation of the servo write/read system 10.

The sample generator signal outputs on lines 180, 182, and 184 are loaded in parallel into shift registers 46, 48 and 50. The 3-line output from the sample register 165 is transmitted directly into ASPs 140, 142 and 144 on line 183. The contents of the registers 46, 48, and 50 are sequentially transmitted on lines 183, 186, 188 and 190 to each of the ASPs 140, 142, and 144. The sample signals received on lines 186, 183, 188, and 190 control the reading of the data from lines 134, 136 and 138 received by ASPs 140, 142 and 144 respectively. When ASP 142 receives clock track information read from disk surface k, the analog output is routed to the clock system 40 on line 192. During burst field verification, the analog outputs of ASPs 140, 142 and 144 are multiplexed onto lines 194 and 196. The signal values on lines 194 and 196 represent the values (A−B) and (A+B) respectively. These values are derived from the relative signal strength of the A and B burst field data contained within a specific header. The signals on lines 194 and 196 are received by an analog to digital (A/D) converter 198. The A/D converter 198 transmits a raw digital servo-correction number (SCN) to the SCN register 199 on line 200. The SCN register 199 transmits the SCN to the servo-writer computer 22 by means of the data bus 24.

A head positioning control unit 208, attached to the control bus 64, contains the position control module 203, spindle control module 205, and the external sensor monitoring and relay control module 207. The position control module 203 adjusts a disk head actuator for positioning the read/write heads over a designated track. The spindle control module 205 adjusts the rotational speed of the disks. The external sensor monitoring and relay control module 207 receives position feedback from a laser reflector during the servo-writing of the burst fields. The modules 203, 205 and 207 and their operation are well known in the art.

A computer 202, responsible for coordinating the servo-reading/writing process, is interfaced to the servo-writer computer 20 by means of a high-speed serial I/O bus 204. A second bus 201 provides an interface between the drive module 58 and the host computer 202. In a manner well known in the art, data bus 24 and the address bus 26, are interfaced to the servo-writer control bus 64 by means of a bus interface 206. This enables the servo-writer computer 22 to transmit head position and disk speed control signals to the disk drive control unit 208.

In the preferred embodiment for servo-writing a plurality of surfaces of the plurality of disks 12 by one or more pre-amplifiers 14, 16 or 18, the first step in preparing the disk surfaces a to v with servo-data requires the writing of a clock track on the disk surface k by means of the clock head 42. The servo-writer computer 22 transmits a clock generation instruction onto lines 24, 26 and 28. The instruction signals are received by bus interface 206. The bus interface 206 transmits the clock generation instruction to the clock system 40 by means of the control bus 64. Upon receiving the clock generation instruction signals from control bus 64, the clock system 40 commences the process of writing a clock track on disk surface k.

Initially, the clock system 40 writes a clock track of intermediate frequency on one of the disk surfaces a to v. In order to write the intermediate clock track, the clock system transmits a clock generation write enable signal to the read/write interface 62 on line 60. The appropriate read/write head is selected by signals transmitted from the register 260 on line 261. After the intermediate frequency clock track is written, the clock system 40 transmits a chain of high frequency pulses on line 44 to the clock head 42. The clock head 42 writes the high frequency pulses onto disk surface k thus establishing a high frequency clock source utilized during the servo-writing process. The clock system 40 receives the clock pulses on line 44 and converts these signals into timing pulses corresponding to a bit, a byte, a sector, and a full disk rotation. Various other approaches to writing a clocking track are also applicable to the current invention and are well known in the art. The clock track and method for writing the clock track described above is illustrative and not intended to limit the scope of the invention.

Figure 4:
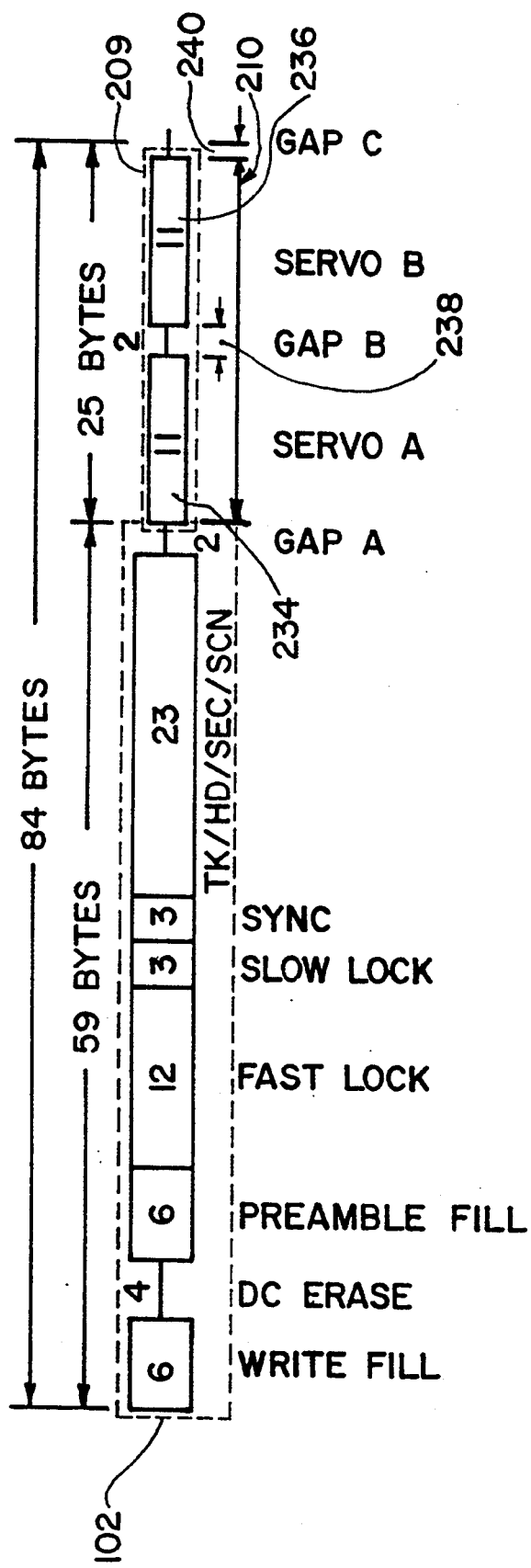
FIG. 4 shows the header and burst field format according to the present invention.
Figure 6:
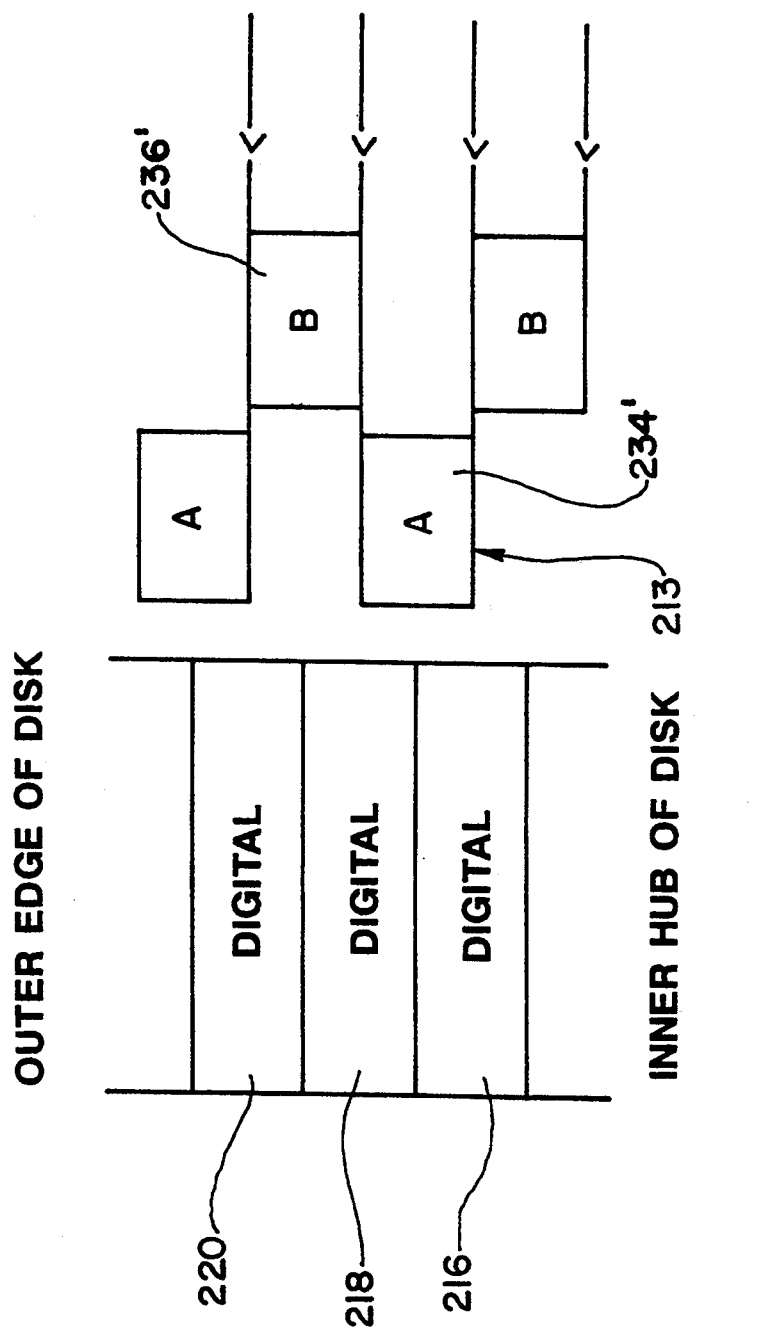
FIG. 6 shows the position of the burst fields with respect to the information track according to the present invention.

The next step in the servo-writing process is to prepare the half-track burst field portion 209 of the header illustrated in FIG. 4. Each header occupies a total space on the media surface of 84 bytes. The on-track portion 102, occupying the first 59 bytes of the header format, contains digital control and address information which is identified on FIG. 4 and is well known and self explanatory. The half-track portion 209, occupying the remaining 25 bytes, contains the analog "A" and "B" servo bursts 234 and 236 respectively. Each A burst field and each B burst field are offset one-half track width on either side of their respective tracks as shown in FIG. 6. In the preferred embodiment, the A and B burst fields 234' and 236' are shared by two tracks each in order to save both track space and time for servo-writing the burst fields to the disk surfaces. First, the A burst fields are written in three passes or disk revolutions. The first two passes establish a slightly oversized track. The third pass trims the inside edge 213 of burst 234' in order to place the field exactly one half of a track width off center with respect to tracks 216 and 218. The same process is followed to place the B burst fields on half-tracks as shown by the placement of burst field 236' between tracks 218 and 220. During the writing of the burst fields the position of the read/write heads is precisely set using the drive's own actuator and an external laser retro-reflector which provides position feedback to the actuator control 208. Various other methods of writing burst fields are well known to those skilled in the art and may be substituted without departing from the scope of the present invention.

Returning to FIG. 1, in order to write the burst fields onto the disk surfaces a to v, first the servo-data for the burst fields is loaded into three, 8 kilobit by 12-bit memory modules 224, 226, and 228 referred to collectively as a header data memory 232. The three data memory modules 224, 226, and 228 contain identical information. It is therefore possible to transmit the header data simultaneously to the header data memory modules 224, 226, and 228 using only twelve lines from data bus 24 connected in parallel to each of the three data memory modules 224, 226, and 228. Of course the choice of the connection scheme between the data memory modules 224, 226, and 228 to the data bus 24 is a design choice and various alternatives would be obvious to one skilled in the art.

The servo-writer computer 22 transmits head select data to a head select memory 230 on a separate set of data lines from those connected to the header data memory 232. Three data lines carry the head select information for determining which read/write head will be activated in the group of either seven or eight heads connected to each of the three pre-amplifiers 14, 16 and 18. In general, S select bits select one of up to 2**S (two to the S power) read/write heads connected to a single pre-amplifier. The servo-writer computer 22 transmits another bit in parallel on the data bus 24 to the head select memory 230. This bit controls the enabling and disabling of writing to the disk surfaces.

The head selection data contained in the memory 230 is coordinated with the header data contained in the memory 232 by simultaneously loading the data in the memory 230 and 232 using the same address bus 26 for each memory module 224, 226, 228, and 230 and enabling each memory module 224, 226, 228 and 230 by means of the read/write signal transmitted by the servo-writer computer 22 on line 28. This connection format is intended to be illustrative and other formats for transmitting data, address, and control information from the servo-writer computer 22 to the memory 230 and 232 would be obvious to one skilled in the art and therefore the above description of loading data into memory is not intended to limit the scope of the present invention.

After burst and head select data is loaded into the memory 230 and 232, the servo write/read system in FIG. 1 waits for an index pulse on line 38 to indicate the beginning point of a disk rotation as determined by clock system 40. The index pulse on line 38 resets the sector counter 222 thus zeroing the output of the sector counter 222 on lines 90 and 91. The sector clock output on line 36 also goes high at the beginning point of a disk rotation. The pulse transmitted on line 36 resets the byte counter 221 thus zeroing the output of the byte counter 221 on line 88. The resetting of the counters 221 and 222 causes an address of zero to be transmitted on read address lines 92 to the memory modules 230 and 232. Therefore, the first byte location on the disk track after the index pulse is transmitted on line 38 is written from location zero in the memory modules 230 and 232. Various other methods for matching data locations in the memory 230 and 232 with the memory locations on a disk track would be obvious to one skilled in the art. All such variations are intended to be included within the scope of this invention.

The memory modules 230 and 232 are continuously scanned by the 13 address lines 92. The head select data is transmitted on line 244 to the read/write interface 62. The lines 246, 248 and 250 transmit 12-bit bytes of header data in parallel to the shift registers 52, 54 and 56. The data in the shift registers is serially transmitted to read/write interface 62 on lines 65, 66 and 68. Shifting of the registers 52, 54, and 56 is synchronized by the bit clock transmitted by the clock system 40 on line 32. Conversion of the 12-bit parallel output of the header data memory 232 into serial data by means of shift registers as well as various other conversion methods are well known in the art. In the preferred embodiment, twelve bit pulses are transmitted on line 32 per byte pulse transmitted on line 34. The number of bit pulses transmitted per byte pulse is a design choice. Other bit/byte ratios are well known in the art and such variations are within the intended scope of the present invention.

The multiplexer 262 receives head select data from the head select memory 230, on line 244 and the manual head select on line 264. A head and pre-amplifier control register 260 transmits a multiplexer control select signal to multiplexer 262 on line 266. Line 266 determines whether the data on line 244 or 264 will be transmitted to the pre-amplifiers 14, 16 and 18 after appropriate buffering on line 128. To write the clock track, the signals on line 264 are transmitted to the pre-amplifier flex 132. To read or write header information, signals on line 244 are transmitted through the multiplexer 262 to the pre-amplifier flex 132.

The head select memory 230 transmits a pre-amplifier write enable signal on line 86 to the read/write interface 62. In order to guarantee a strong shut off signal to the pre-amplifiers 14, 16 and 18 when the outputs of the memory modules 230 and 232 are not valid, the write enable signal on line 86 is received by buffer 270 and transmitted on line 114. The head select data is received by a buffer 272 on line 274 and transmitted to the pre-amplifiers 14, 16 and 18 on line 128. Pre-amplifier select signals are transmitted by the register 260 on line 261 to the read/write interface 62. In general, the read/write interface 62 buffers the input signals in order to avoid indeterminate values when inputs to the interface are disabled and to produce signals of sufficient strength for the pre-amplifier inputs. Various methods for buffering signals to prevent indeterminate signal values and produce sufficiently large signal currents are well known to those skilled in the art.

The amplitude of the write current on line 130 determines the amplitude of the data signal transmitted to the disk surfaces a through v. The amplitude of the write current is controlled by the value of the 5-bit digital write current value stored in the write current register 172. The servo-writer computer 22 transmits the digital write current value to the register 172 by means of the data bus 24. The register 172 transmits the digital write current value to the digital to analog converter 98 on line 97. The digital to analog converter 98 produces a current on line 100 proportional to the magnitude of the digital value stored in the register 172. The current on line 100 is received by read/write interface 62 and transmitted on 3 lines 130 to the pre-amplifiers 14, 16 and 18.

After the first set of byte information is processed by the servo write/read system 10, the clock system 40 transmits a byte pulse on line 34 to a byte counter 221. The byte pulse causes the byte counter 221 to increment its count/output by one. The counters 221 and 222 now transmit an address value of one on address lines 92 and data and header select information is retrieved from address location one in the memory modules 230 and 232. The set of byte information located at address location one is processed in the same manner as the byte described above located at address location zero.

Figure 3:
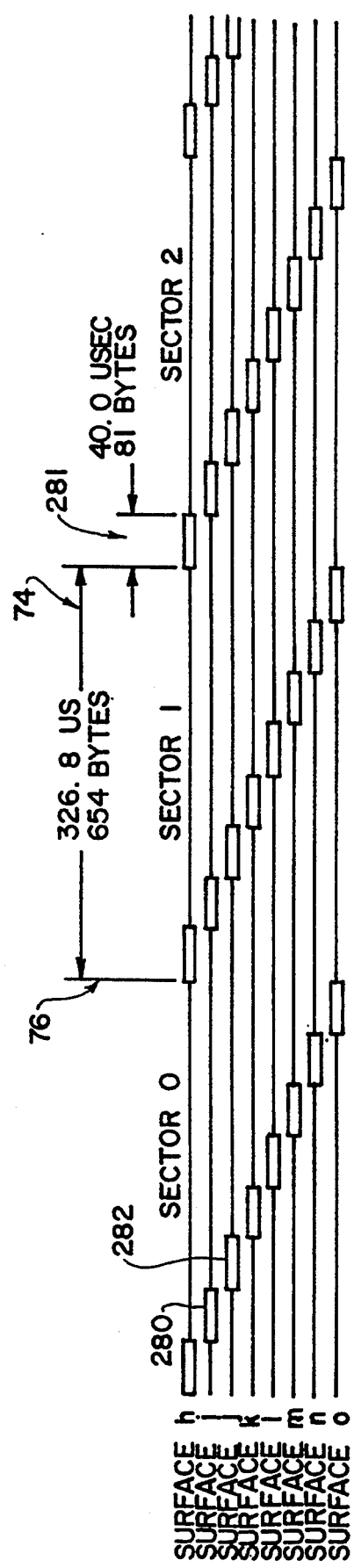
FIG. 3 shows a typical shifting format of header fields for a single pre-amplifier according to the present invention.

The write cycle described above continues in the manner described until the end of the first sector 76 in FIG. 3. FIG. 3 shows the length of a sector 74 in the preferred embodiment to be 654 bytes. In the servo write/read system of the preferred embodiment this represents a rotational time span of 326.8 $\mu$sec. Of course, the length of a sector is a design consideration and sectors of different length are considered to be within the scope of the present invention. When the servo write/read system has processed the 654th byte of servo write/read information marking the end of the first sector, the system clock 40 transmits a sector clock pulse on line 36 to the counters 221 and 222. The sector clock pulse increments the sector counter 222 and resets (zeroes) the byte counter 221. Thus, the memory location corresponding to the first byte of the second sector is accessed and processed by the servo write/read system 10.

The memory modules 230 and 232 making up the pattern memory 233 are each 8 kilobits in length. The pattern memory 233 holds enough servo-write data for writing up to eight sectors on each disk surface a to v without updating the memory 233. In order to write to more than eight sectors without interruption to refill the pattern memory 233, the servo write/read system 10 utilizes multi-port memory for the pattern memory 233. The use of multi-port memory devices in pattern memory 233 enables the servo-writer computer 22 to place new data into the pattern memory modules 230 and 232 through one port while servo-write data is simultaneously being read from the pattern memory 233 by means of the other port. Multi-port memory and simultaneous access of memory through multiple ports are well known in the art.

The counters 221 and 222 are incremented in the manner described above until the end of the first rotation. The sector counter 222 contains 7 bits thus providing the capability of addressing 128 sectors within a single track. When the servo write/read system 10 has processed the 654th byte of the last sector on the track, the system clock 40 waits until the beginning of the next rotation, then transmits a sector pulse on line 36 marking the beginning of a new sector and an index pulse on line 38 marking the beginning of a new disk rotation. The sector and index pulses reset (zero) the outputs of the byte counter 221 and the sector counter 222 respectively. Thus, location zero is again accessed in the memory modules 230 and 232, and the process of writing described above may be repeated on a new track. This description of the servo-writing process was intended merely to show the preferred method for servo-writing and reading servo-data from a plurality of disk surfaces within a single disk rotation. Alternative methods of providing individual signals and the specific computer circuitry for transferring servo-data to a plurality of disk surfaces from a single service channel within a single disk rotation would be obvious to one skilled in the art.

Since the length of a single header is much smaller than the length of a sector, it is possible to write header information to several surfaces by allowing the information to be placed in positionally off-set locations on the disk. In the preferred embodiment shown in FIG. 1, pre-amplifiers 14, 16, and 18 each write or read to a plurality of disk surfaces within a single disk rotation. Switching active heads from a plurality of heads connected to a single pre-amplifier will be referred to hereinafter as "head switching" or merely "switching".

Figure 13:
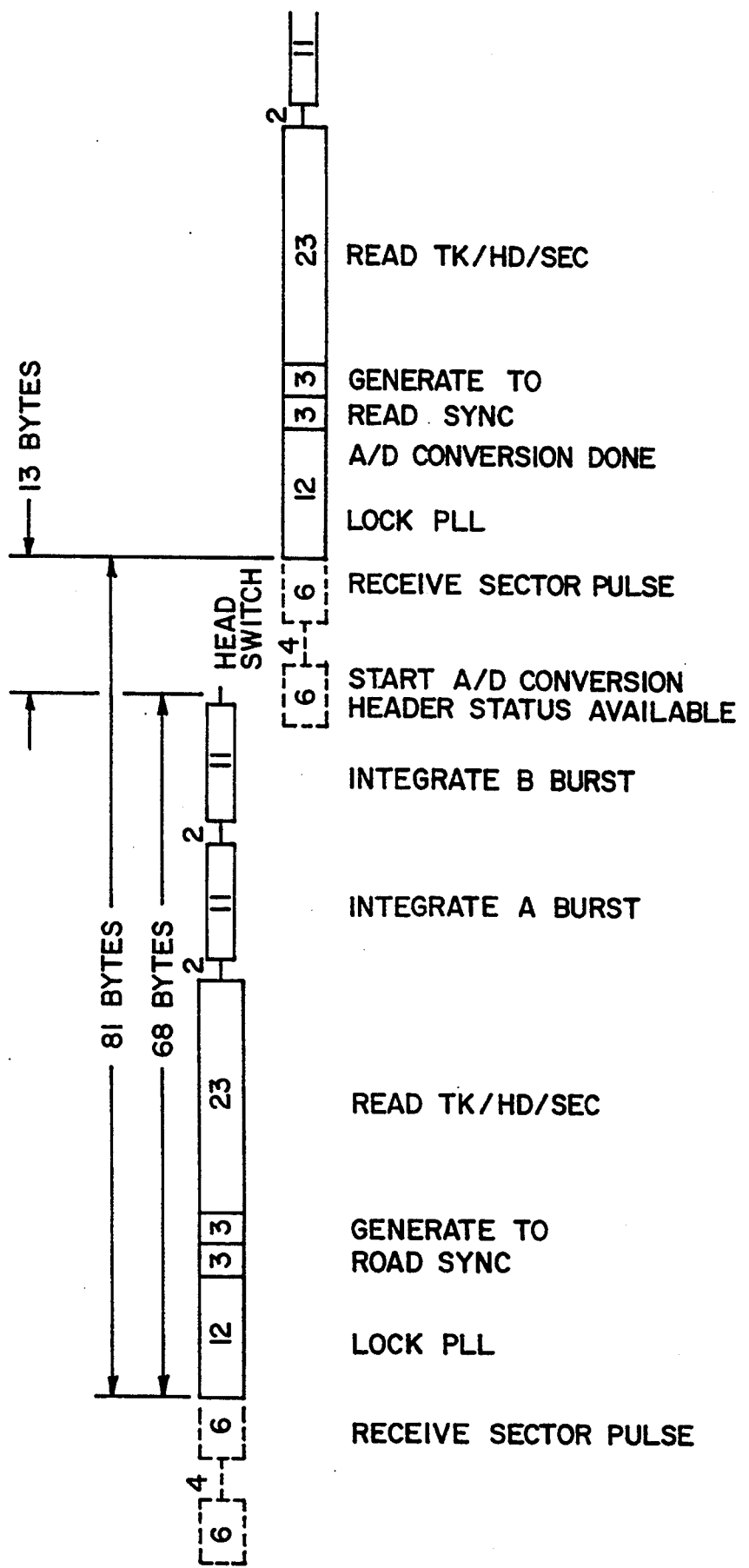
FIG. 13 describes the hardware timing for the servo system.
Figure 14:
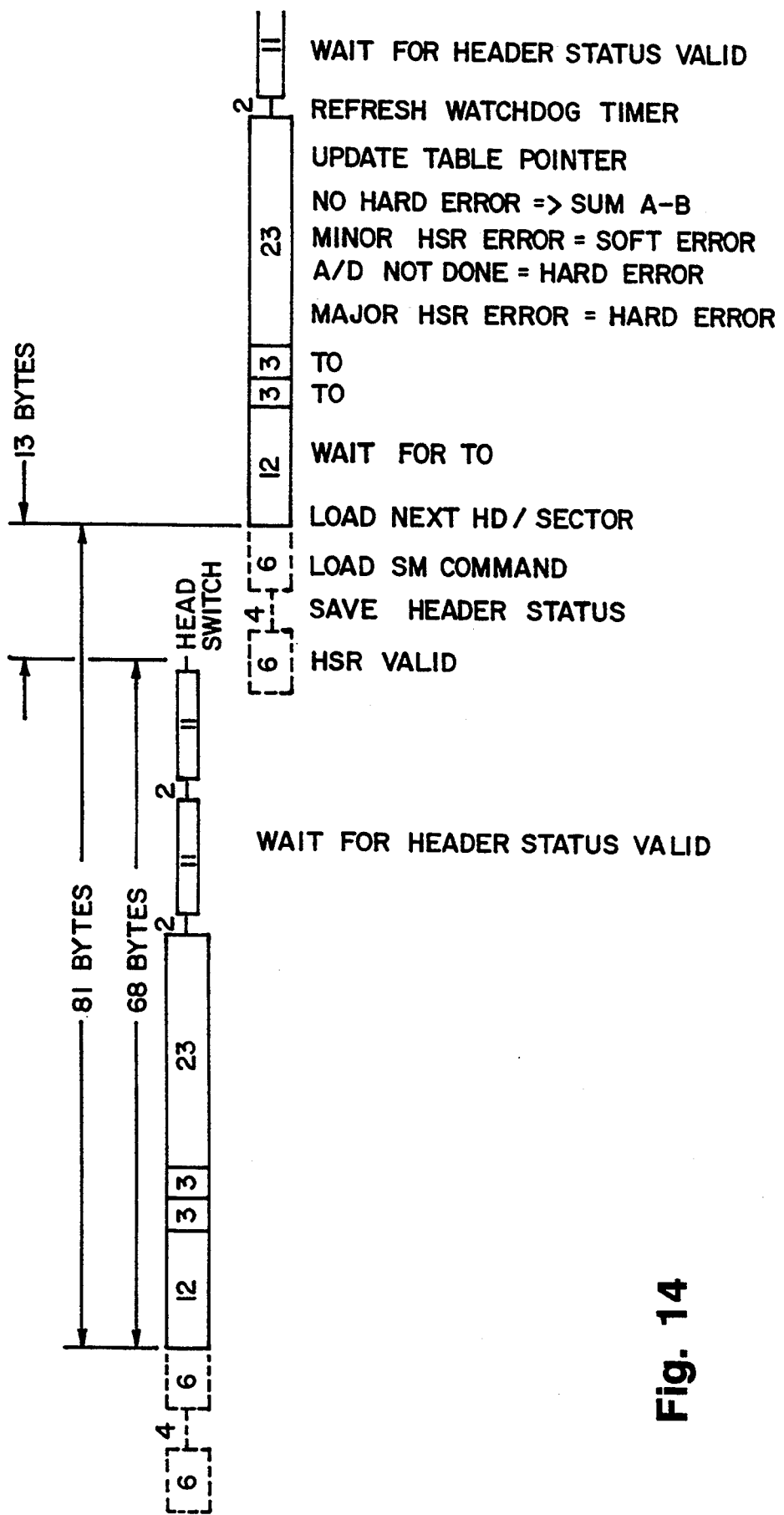
FIG. 14 describes the software timing for the servo system.

Turning to FIG. 3, the maximum number of disk surfaces that may be read or written by each pre-amplifier 14, 16, or 18 in FIG. 1 or pre-amplifier 4 in FIG. 2 within a single disk rotation depends upon the sector length 74 (the number of bytes between the beginnings of successive headers on the same track of the same disk surface) and the longest effective length of the servo-data segment written or read during a single rotation. Since disk data read or written from different disk surfaces within a single disk rotation (e.g. headers 280 and 282 in FIG. 3) cannot overlap, the longest effective length of a segment read or written in a single pass determines the minimum spacing 281 between the beginnings of adjacent headers 280 and 282. The effective length consists of the length in bytes of the segment read or written, plus an additional number of delay bytes for the servo read/write system 10 to execute certain hardware and software routines illustrated in FIGS. 13 and 14. These routines are well known in the art.

Figure 7:
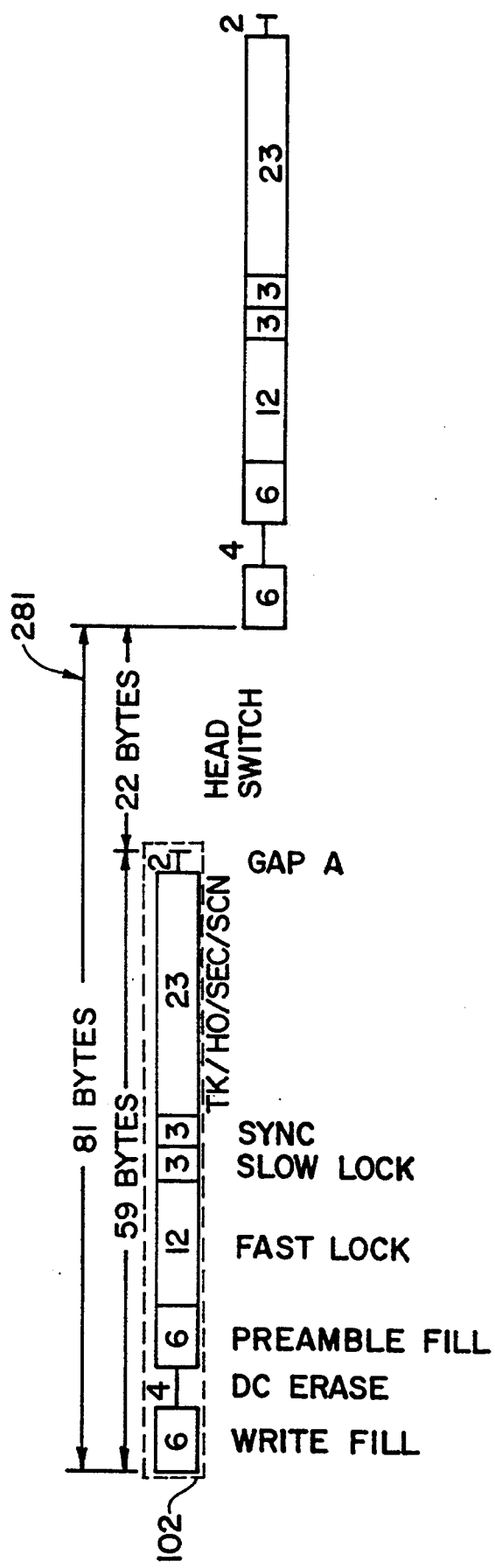
FIG. 7 shows the on-track header format and stagger of successively written disk surfaces.

In FIG. 3, illustrating the preferred format for writing to a plurality of disk surfaces through a single pre-amplifier, the length of each sector 74 is 654 bytes. In the preferred header format illustrated in FIG. 4, the longest segment written or read in a single rotation is the on-track portion 102. FIG. 7 shows 59-byte on-track headers 102 written in a signal rotation by the servo write/read system 10 as well as the spacing between the end of the first field written and the beginning of the next consecutive header written by the servo write/read system 10. The contents of the header 102 are well known and self-explanatory. Twenty-two bytes are reserved for head switching in the preferred embodiment of the current invention. The time required to switch heads in the preferred servo write/read system 10 is less than the time equivalent to writing 22 bytes to a disk surface, the additional bytes are included in order to accommodate the timing requirements of the hardward and software routines shown on FIGS. 13 and 14 respectively. Since 22 bytes of buffering are required to switch heads, then the longest effective length using the format shown in FIG. 4 is 81 bytes. The minimum distance between the beginnings of non-overlapping adjacent headers 281 (e.g. 280 and 282) is 81 bytes. Thus, a single channel in the preferred embodiment may read or write on-track header fields to a maximum of eight surfaces in one rotation (the least integer value of 654 divided by 81). For any disk configuration of eight or less disk surfaces per pre-amplifier, the time division switched system of the present invention performs as well as a completely parallel system providing a pre-amplifier or service channel for each disk surface. Of course this is only an example of one sector/header format. Various other combinations of header and sector lengths would be obvious to one skilled in the art and are within the scope of this invention.

As discussed with reference to the servo system 10 shown in FIG. 1, the preferred header format and the preferred sector length set the maximum number of surfaces that may be served by a single channel in single rotation at eight. It is obvious that the number of surfaces or the sector lengths can be varied to accommodate different design objectives without departing from the scope of the present invention. In the preferred embodiment, the servo-writer system 10 provides additional channels in order to read from or write to 22 surfaces within a single disk rotation. Pre-amplifiers 14 and 18 servo-write seven surfaces each (a to g and p to v) and the pre-amplifier 16 servo-writes eight surfaces (h to o).

Figure 5:
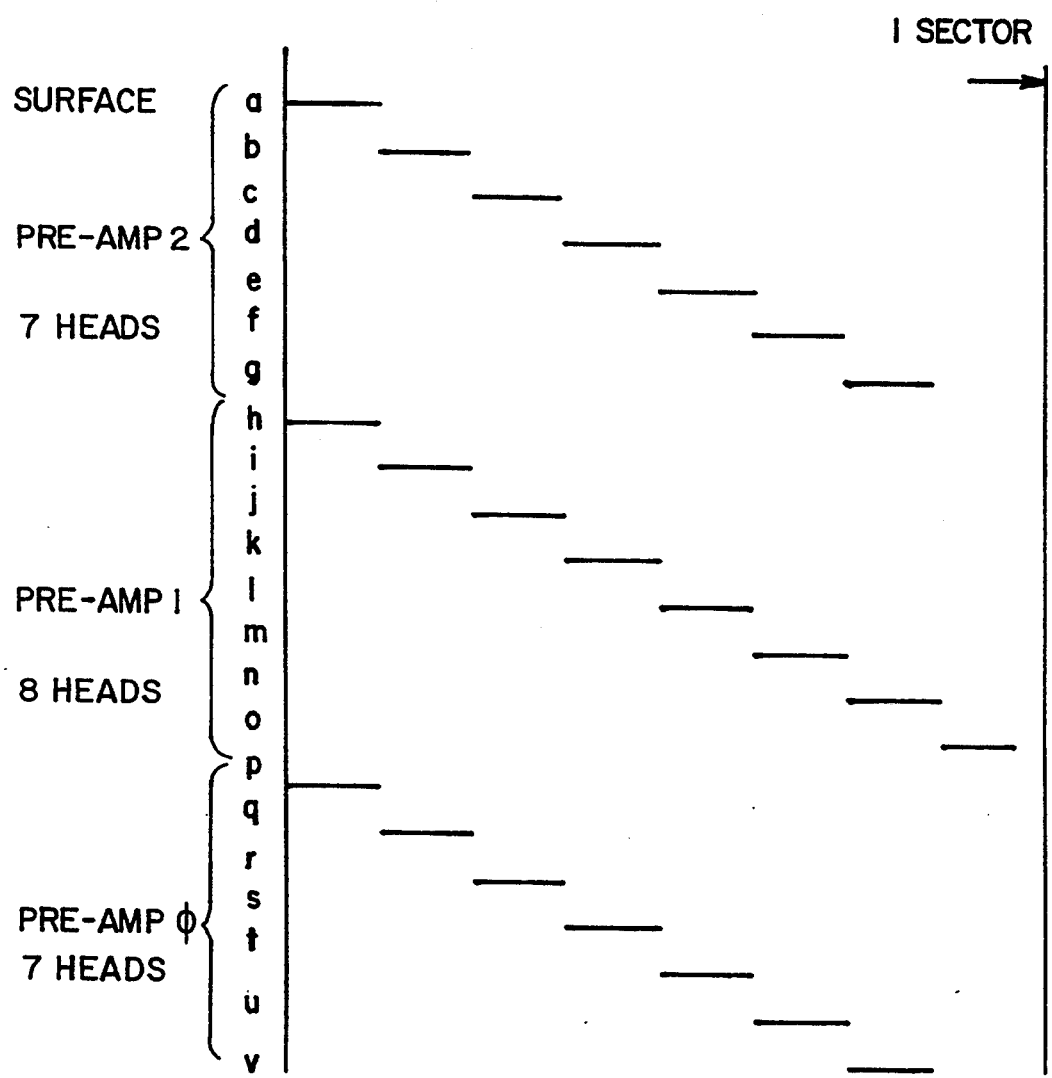
FIG. 5 shows the burst field formats and stagger for the A and B burst fields according to the present invention.

FIG. 5 illustrates the positional locations of the 22 headers of the 22 media surfaces written A to V by the servo write/read system 10 within a sector. Since there are three read/write channels available, three headers can be accessed concurrently as illustrated by the degree of vertical overlap in the header positions drawn on FIG. 5. FIG. 3 illustrates the positional locations of the complete headers on the track surfaces for the surfaces h to o served by pre-amplifier 16 and the surfaces a to v served by pre-amplifiers 14, 16 and 18 respectively. It should be noted that in the preferred embodiment, part of the half-track data overlaps the on-track data of positionally adjacent headers (e.g. headers 280 and 282) by three bytes. However, since these portions of the headers are never read or written within a single rotation, this overlap does not prevent pre-amplifiers 14, 16, and 18 from reading data from all seven or eight of their respective disk surfaces within a single disk rotation.

Figure 8:
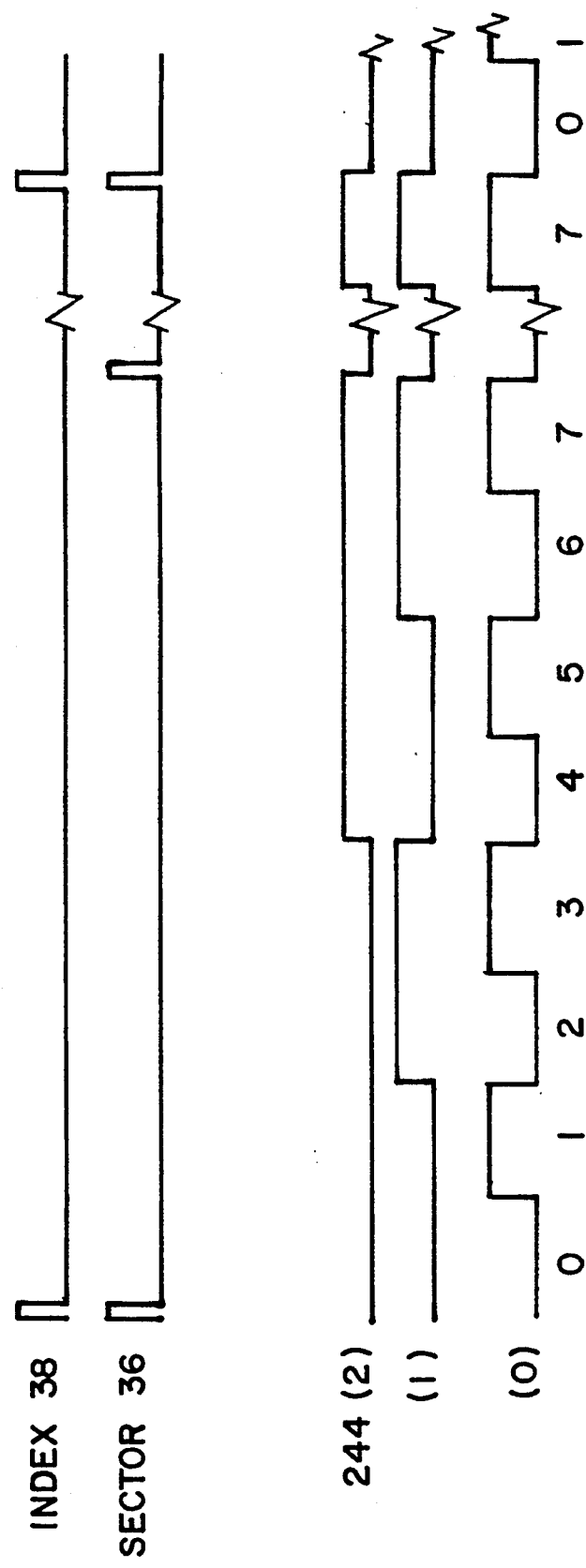
FIG. 8 shows the head address timing for reading and writing on-track headers and half-track bursts for an eight surface format of head switching.

Head switching is facilitated by storing a head select map in the head select memory module 230. As previously explained, the memory module 230 contains head select control data corresponding to each byte location on the disk track as the disk rotates during the servo-writing process. Even though storing a set of head select signals for each byte of memory transferred to a disk track appears to allow switching to occur at a frequency equal to the rate at which bytes of data are transferred to a track, in actual practice however a larger delay is necessary during a head switch in order to execute hardware and software routines previously discussed. However, the one byte resolution for head select control allows timing adjustments to be made in increments of a byte. FIG. 8 diagrammatically represents the signals transmitted from the head select memory 230 on the select lines 244 to the read/write interface 62 in the preferred servo write/read system 10. The use of the memory 230 to control head selection as a means for facilitating time division switching of active read/write heads within a single disk rotation is illustrative. Various alternative means for implementing the head switching method disclosed above would be obvious to one skilled in the art.

In the preferred header format shown in FIG. 4, the half-track burst field 210 consisting of the burst fields 234 and 236, and the gaps 238 and 240 occupy a total space of 25 bytes per header written on a disk surface. Thus, the length of the half-track header 210 is approximately one-third the distance between consecutive header beginnings.

An alternative method for serving a group of greater than eight surfaces using a single channel is used by the servo-writer system 11 partially shown in FIG. 2. Servo-writer system 11 comprises a single pre-amplifier 4 connected to and serving 14 disk surfaces A to N. Instead of three head address lines 128 the alternative embodiment contains four lines in order to allow the service channel to switch between the 14 distinct read/write heads corresponding to disk surfaces A to N. The remaining servo-writing hardware is essentially the same as the servo write/read system 10 shown in FIG. 1 and any modifications thereto would be within the ability of one skilled in the art. Parallel electronic components for accommodating the three pre-amplifiers 14, 16 and 18 in the servo write/read system 10 are however replaced by single components in a manner obvious to one skilled in the art.

Instead of increasing the number of pre-amplifiers in order to accommodate the number of surfaces exceeding eight, the surfaces A to N are sub-grouped into two separate sets of surfaces. Each group is normally served in a separate rotation. The disk surfaces A to N are sub-grouped into two groups of seven surfaces (A to H and I to N). The pre-amplifier usually writes to surfaces A to H during one rotation and writes to I to N during the second rotation. In some instances however, all surfaces may be read or written during a single rotation.

Figure 9:
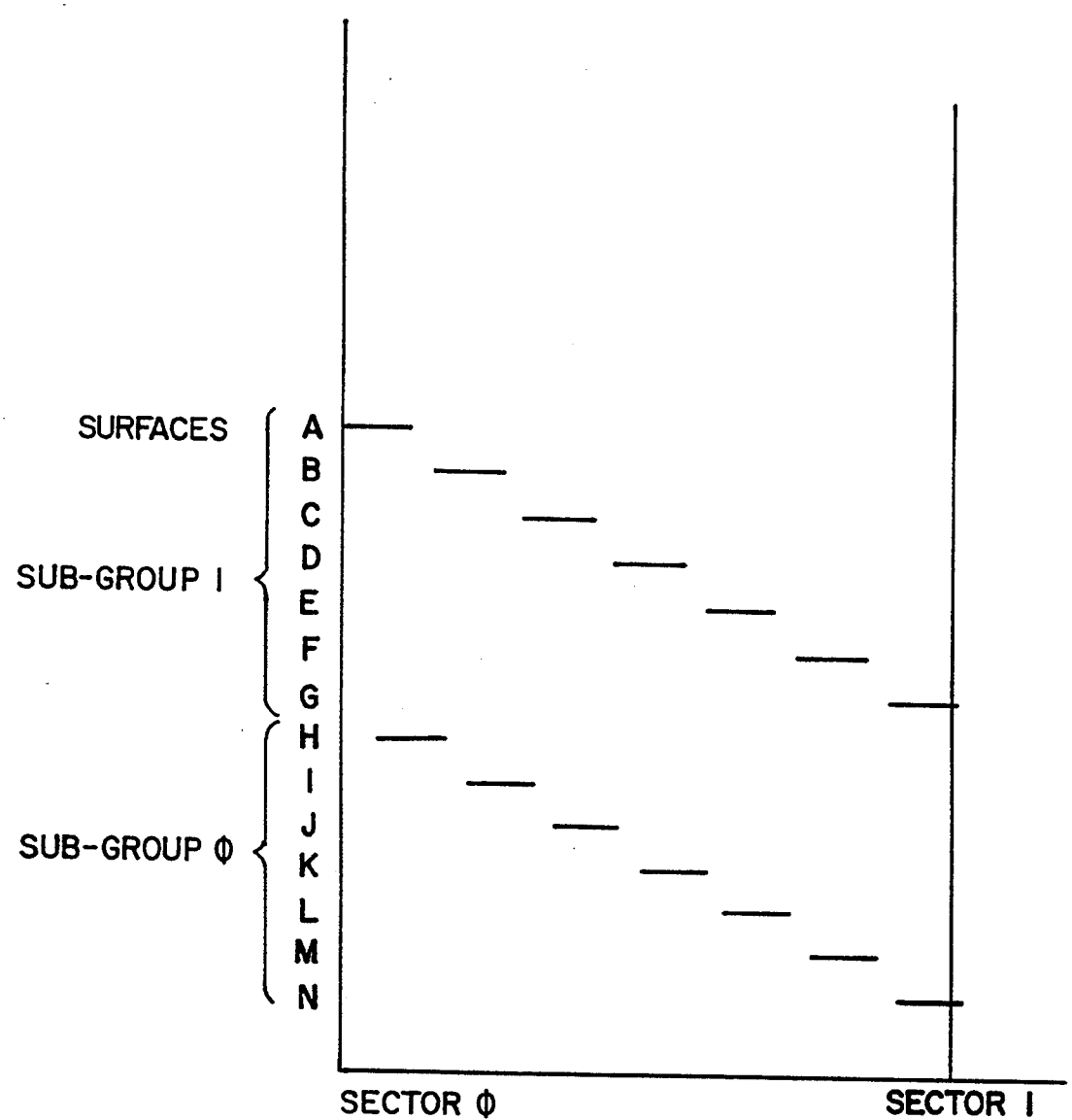
FIG. 9 shows the stagger of the headers for a typical sector in an 14 surface format, single pre-amplifier servo system.
Figure 10:
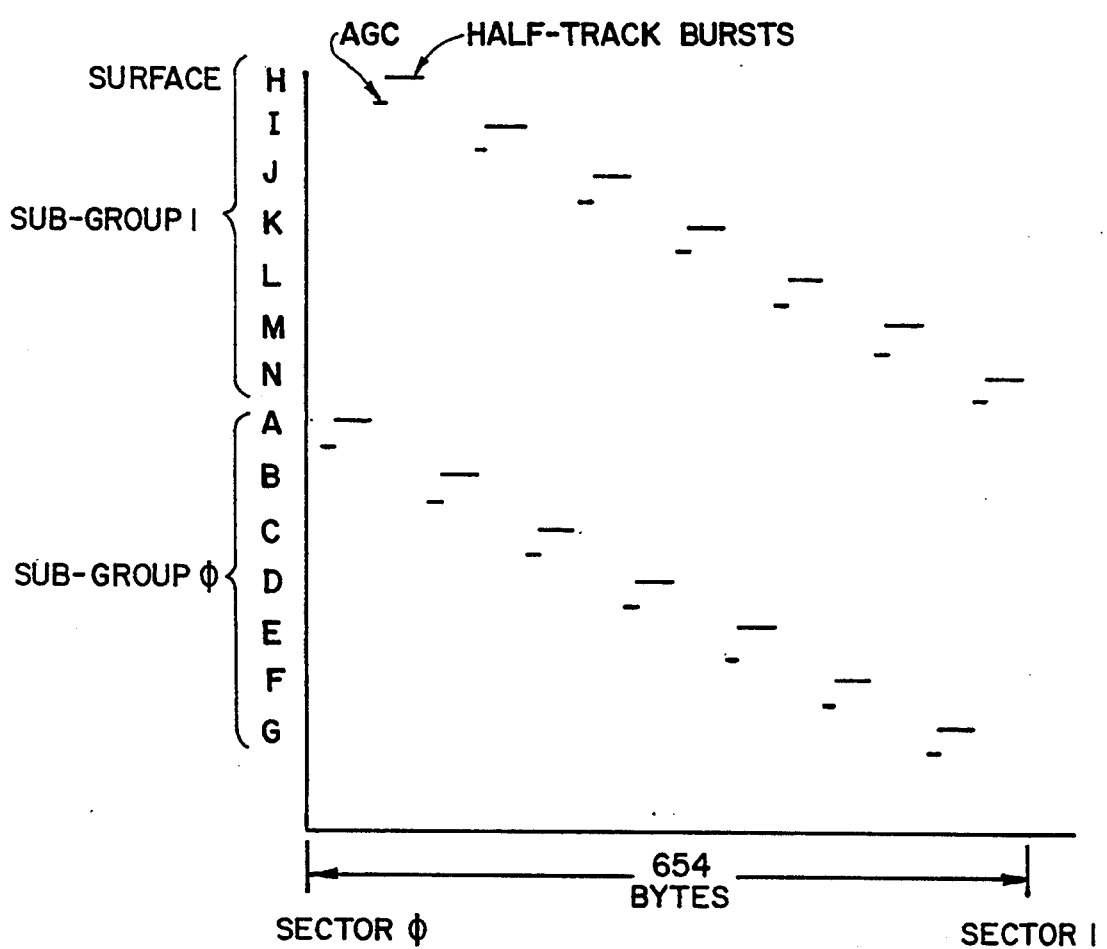
FIG. 10 shows the temporary on-track header and interleaving format to allow all surfaces to be read during a single disk rotation.

The length of the half-track burst field 210 is considerably shorter than the number of bytes between consecutive header beginnings. As a consequence, the servo write/read system 11 partially illustrated in FIG. 2 writes to all fourteen surfaces during a single rotation while writing the half-track bursts 209. The staggering of header positions which makes the writing to all 14 surfaces in a single rotation possible is illustrated in FIG. 9. The relative positions of the half-track bursts are shown in FIG. 10 along with the automatic gain control header field. The servo write/read system 11 writes burst fields to all fourteen surfaces A to N in the same disk rotation even though the on-track headers must be written in two rotations.

FIG. 11 illustrates the timing for the head selection signals in the servo write/read system 11 transmitted on lines 128 (0–3) with respect to the index and sector pulses transmitted on lines 38 and 36 respectively. Signals 128 (0–3) illustrate the head select signals transmitted on lines 244 while the servo write/read system 11 partially illustrated in FIG. 2 writes the off-track bursts. Writing half track bursts 234 or 236 to all surfaces in a single rotation is accomplished by first dividing the surfaces A to N into two groups of seven surfaces. After grouping the surfaces, the memory position of the head select and header information for the second group of disk surfaces in the pattern memory 233 is shifted by a sufficient number of bytes (by adding a constant offset to each set of data loaded into the pattern memory 233) so that the half-track information on the first group of surfaces A to G (including head switch delays) does not overlap the half-track information on the second group of surfaces H to N. FIG. 9 shows the temporal placement of the headers for the 14 media surfaces of servo write/read system 11. FIG. 9 shows the shifting of the header positions for the second set of media surfaces. FIG. 11 illustrates the timing of the head address signals during the writing of the on-track and half-track header fields. As shown in FIG. 11a, the pre-amplifier 4 first transmits half-track data to surface A then to H, then to B, then I, C, J, D etc. The final surfaces written within a sector time frame when the writing to surfaces is interleaved are G and N. Signals 128 (0–3); in FIG. 11b illustrate the head select signals transmitted on lines 128 while the servo-write/read system 11 partially illustrated in FIG. 2 writes the on-track headers. The on-track headers are written in two rotations.

After the servo bursts are written to the disk surfaces a to v, the three-service channel servo write/read system 10 writes the on-track headers 102 in the form and spacing illustrated in FIG. 7 to disk surfaces h to o in the staggered format described earlier and illustrated in FIGS. 3 and 5. The contents of the on-track headers 102 are well known and their labels self-explanatory. The use of the byte and sector clocks 221 and 222 to access head select and header information contained in pattern memory 233 is the same as the method described to write the half-track bursts 209 described above.

Servo write/read system 10 writes the header data to the other fourteen surfaces a to g and p to v during the same disk rotation and in the same manner as surfaces h to o except that only seven surfaces are written per pre-amplifier channel instead of eight. The eighth time slot for writing servo-information is not utilized in the seven-surface groups of surfaces.

The on-track headers for the servo write/read system 11 partially illustrated in FIG. 2 are written in a slightly different format than the on-track headers for the embodiment shown in FIG. 1. For the 14 surface embodiment, on-track headers are actually written twice. The first time the on-track header is written, a temporary 10-byte on-track header, called the pseudo automatic gain control (AGC) field, is written just in front of the half-track burst fields instead of the usual 59 byte version 102 illustrated in FIG. 4. The short format enables the single pre-amplifier 4 to read on-track and half-track information from disk surfaces A to N within a single disk rotation during the SCN generation stage of the servo write/read process. The regular long format would allow only 7 surfaces of the total 14 to be read during a single disk rotation. Since the half-track burst read process requires over 10 disk rotations while writing the on-track headers takes only a single rotation, substantial time savings is realized by using the temporary 10-byte on-track header for the servo correction number (SCN) measurement step even though this method for servo-writing requires the on-track header to be written twice. The temporary format is not used in the 22 surface embodiment shown in FIG. 1 because all surfaces can be read at the same time even when the long format illustrated in FIG. 4 is used. The staggered placement of the temporary on-track headers and the half-track bursts for the 14 surfaces A to N is illustrated in FIG. 10.

In the preferred servo write/read system 10 the final step in preparing the disk surfaces is to determine the quality and relative signal strength of the A and B burst fields. This process comprises generation and writing of servo correction numbers (SCNs). The generation and use of SCNs is well known to those skilled in the art.

Head selection data for reading the information from the disk surfaces a to v is loaded into the head select memory 230 in the same manner as for writing information to the disk surfaces explained above. The servo-writer computer 22 transfers sample patterns to the sample generators 162, 164, 165 and 166 by means of the data and address buses 24 and 26. The multiport memories 162, 164, 166 and 165 contain the sample patterns corresponding to the AGC, "A" burst, "B" burst, and head switch fields respectively. The sample generators 162, 164, 165 and 166 transmit enabling signals for loading the ASP unit 145 with header data stored on the disk surfaces a to v. All four signals act as strobes to enable ASPs 140, 142 and 144 to receive only valid information strobing input information is well known in the art.

Figure 12:
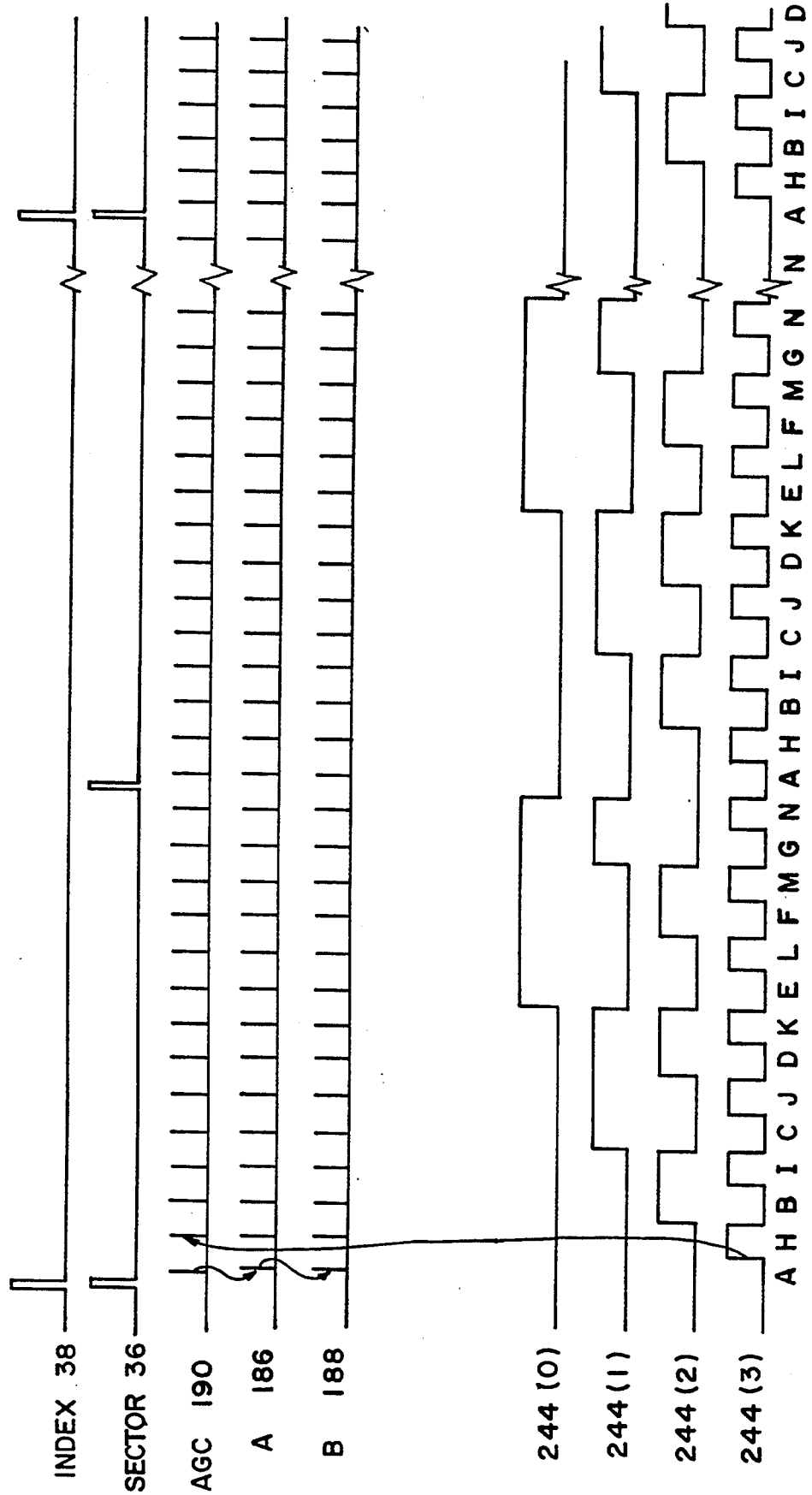
FIG. 12 is a timing diagram showing the clock and head select signals during data collection in an 14 surface, single pre-amplifier servo system.

The counters 221 and 222 transmit read locations on address lines 88 and 91 to the sample generators 162, 164, and 166 and the head select memory 230. The timing scheme for sampling the AGC, "A" burst, and "B" burst fields for the 14 surface servo write/read system 11 is illustrated in FIG. 12. The AGC, head switch, "A" and "B" sample signals are transmitted on lines 190, 183, 186 and 188 respectively. The sample patterns for the preferred servo write/read system 10 are similar to those illustrated in FIG. 12 except the head select cycle contains eight divisions per sector instead of fourteen.

The ASPs 140, 142 and 144 receive AGC and half-track burst data serially from pre-amplifiers 14, 16 and 18 on lines 134, 136 and 138 respectively. "A" equals the analog value of the signal stored in the "A" burst field 234, and "B" equals the analog value of the signal stored in the "B" burst field 236. The ASPs transmit the analog values (A−B) and (A+B) on lines 194 and 196 respectively to the ratiometric analog to digital converter 198. In a manner well known to those skilled in the art, the analog to digital converter 198 converts the inputs into a ten-bit binary number representing the value (A−B)/(A+B). The 10 bit SCN is temporarily stored in SCN register 199 before the SCN is transmitted to the servo-writer computer 22 by means of the data bus 24. The SCN is then written along with any other on-track header information that remains to be placed on the disk surface by means of the process described above for writing the on-track headers to the disk surfaces a to v of the servo write/read system 10. In the 14 surface servo write/read system 11 of FIG. 1, the temporary 10-bit on-track header used for generating SCN's is replaced by the 59-bit on-track header in the format shown in FIG. 4 in a write cycle to the disk surfaces A to N.

In the preferred embodiment of the servo write/read system 10, the host computer 202 verifies the servo-data by means of the drive module 58 and the interface 201 while the SCNs are determined. The drive module 58 receive the data from read lines 134, 136, and 138 from the read/write interface 62 and is synchronized by means of the sector pulse transmitted on line 36 from clock system 40. In the preferred embodiment, the drive module 58 receive and process data from only one of the three lines 134, 136 or 138 during a given disk rotation. The register 176 transmits control signals on line 147 to the multiplexer 146. The multiplexer 146 then routes data from lines 134, 136, and 138 to the drive module 58 on line 148. This description of the SCN generation and data verification hardware and procedure is illustrative. Other methods and electronic circuitry for generating SCNs and verifying data are well known to those skilled in the art and are intended to be within the scope of the present invention.

The method and apparatus for time division switching the reading and writing of servo data to a plurality of surfaces within a single disk rotation from multiple channels or pre-amplifiers described above is intended to illustrate the preferred embodiment of the present invention. The scope of the invention is intended to cover all variations and substitutions in the above illustrative embodiment including without limitation single channel interleaving.

What is claimed is:

1. A method of arranging header data in a data storage-type disc drive system having a plurality of writing surfaces, a plurality of tracks on each of said writing surfaces, a plurality of sectors of predetermined length on each of said tracks and a servo header for containing header data, said header data having a predetermined length, said method comprising the steps of:
   configuring said writing surfaces into a plurality of writing surface groups, with each of said groups having a number of said writing surfaces less than or equal to the number of times said header data is writable within said predetermined length of one of said sectors such that the total length of all header data written to one of said writing surface groups in a single revolution of said writing surfaces does not exceed said predetermined length of one of said sectors; and
   writing said header data in a staggered relationship onto at least two of said plurality of tracks on different ones of said writing surfaces in one of said writing surface groups during a single-pass operation comprising a single revolution of said writing surfaces.

2. An apparatus for arranging header data in a data storage-type disc drive system having a plurality of writing surfaces, a plurality of tracks on each of said writing surfaces, a plurality of sectors of predetermined length on each of said tracks and a servo header for containing header data, said header data having a predetermined length, comprising:
   means for configuring said writing surfaces into a plurality of writing surface groups, with each of said groups having a number of said writing surfaces less than or equal to the number of times said header data is writable within said predetermined length of one of said sectors such that the total length of all header data written to one of said writing surface groups in a single revolution of said writing surfaces does not exceed said predetermined length of one of said sectors; and
   means for writing said header data in a staggered relationship onto at least two of said plurality of tracks on different ones of said writing surfaces in one of said writing surface groups during a single-pass operation comprising a single revolution of said writing surfaces.

3. A method of arranging header data in a data storage-type disc drive system having a plurality of writing surfaces, a plurality of tracks on each of said writing surfaces, a plurality of sectors of predetermined length on each of said tracks and a servo header for containing header data, said header data having a predetermined maximum length, said method comprising the steps of:

configuring said writing surfaces into a plurality of writing surface groups, with each of said groups having a number of said writing surfaces less than or equal to the number of times said header data is writable within said predetermined length of one of said sectors such that the total length of all header data written to one of said writing surface groups in a single revolution of said writing surfaces does not exceed said predetermined length of one of said sectors;

writing said header data onto a first one of said plurality of tracks on a first one of said writing surfaces in a first one of said writing surface groups during a first portion of a single-pass operation comprising a single revolution of said writing surfaces; and writing said header data onto a second one of said plurality of tracks on a second one of said writing surfaces in said first one of said writing surface groups in a staggered relation to said header data written onto said first track during a second portion of said single-pass operation comprising said single revolution of said writing surfaces.

4. An apparatus for arranging header data in a data storage-type disc drive system having a plurality of writing surfaces, a plurality of tracks on each of said writing surfaces, a plurality of sectors of predetermined length on each of said tracks and a servo header for containing header data, said header data having a predetermined maximum length, comprising:

means for configuring said writing surfaces into a plurality of writing surface groups, with each of said groups having a number of said writing surfaces less than or equal to the number of times said header data is writable within said predetermined length of one of said sectors such that the total length of all header data written to one of said writing surface groups in a single revolution of said writing surfaces does not exceed said predetermined length of one of said sectors;

means for writing said header data onto a first one of said plurality of tracks on a first one of said writing surfaces in a first one of said writing surface groups during a first portion of a single-pass operation comprising a single revolution of said writing surfaces; and means for writing said header data onto a second one of said plurality of tracks on a second one of said writing surfaces in said first one of said writing surface groups in a staggered relation to said header data written onto said first track during a second portion of said single-pass operation comprising said single revolution of said writing surfaces.

5. The method of arranging header data as set forth in claim 1 further comprising the step of:

writing said header data in a staggered relationship onto at least two of said plurality of tracks on different ones of said writing surfaces in each remaining one of said writing surface groups during the same said single pass operation comprising a single revolution of said writing surfaces.

6. Apparatus for arranging header data as set forth in claim 2 further comprising:

means for writing said header data in a staggered relationship onto at least two of said plurality of tracks on different ones of said writing surfaces in each remaining one of said writing surface groups during the same said single pass operation comprising a single revolution of said writing surfaces.

* * * * *